(12) United States Patent
Nigrin

(10) Patent No.: US 7,376,594 B2
(45) Date of Patent: May 20, 2008

(54) METHOD FOR DISTRIBUTING IMAGES VIA A NETWORK

(75) Inventor: Markus Nigrin, Passau (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 881 days.

(21) Appl. No.: 10/380,693

(22) PCT Filed: Sep. 18, 2001

(86) PCT No.: PCT/EP01/10791

§ 371 (c)(1), (2), (4) Date: Aug. 18, 2003

(87) PCT Pub. No.: WO02/23415

PCT Pub. Date: Mar. 21, 2002

(65) Prior Publication Data

US 2004/0039653 A1 Feb. 26, 2004

(30) Foreign Application Priority Data

Sep. 18, 2000 (DE) .............................. 100 46 011

(51) Int. Cl.
*G06Q 30/00* (2006.01)
(52) U.S. Cl. ........................................ 705/26
(58) Field of Classification Search ................. 705/26, 705/27
See application file for complete search history.

(56) References Cited

U.S. PATENT DOCUMENTS 6,029,141 A * 2/2000 Bezos et al. ................ 705/27
2005/0144093 A1 * 6/2005 Kassan ......................... 705/27

FOREIGN PATENT DOCUMENTS

WO WO99/57864 * 11/1999

OTHER PUBLICATIONS

Dialog File 610, Acc#: 00452292.*

* cited by examiner

*Primary Examiner*—Naeem Haq

(57) ABSTRACT

A method for the distribution of pictures over a network, whereby a supplier computer, a web shop computer and a customer computer are connected to the network, whereby a supplier makes a large number of pictures accessible via the network and the purchase is possible via a web shop and whereby the method exhibits the following steps: saving of digital data, which represent the supplier's pictures in a storage device of the supplier computer; assignment of at least one hyperlink to the digital data, whereby the at least one hyperlink is used for initiating an order method for the ordering of at least one picture and refers or contains information which refers to the web shop computer; establishing of a connection between the customer computer and the supplier computer via the network; reading out of the data saved in the storage device of the supplier computer and displaying of the appropriate pictures and the at least one assigned hyperlink on a display device of the customer computer; activation of the hyperlink by the customer for ordering at least one picture; establishment of a connection in response to the activation of the hyperlink between the customer computer and the web shop computer via the network for initiating the order method; execution of the order method and sending of a confirmation query from the web shop computer to the customer computer including reference data which represent the at least one ordered picture; reception of the confirmation query by the customer computer and sending of a confirmation message from the customer computer to the web shop computer for the case where the appropriate order is to be executed; establishment of a connection between the web shop computer and the supplier computer via the network in response to a positive confirmation by the customer; reading out of those digital data which represent the at least one ordered picture by the web shop computer from the storage device of the supplier computer; and processing of the read-out picture data according to the customer's desired picture format.

29 Claims, 6 Drawing Sheets

METHOD FOR DISTRIBUTING IMAGES VIA A NETWORK

This invention relates to a method for distributing pictures over a network.

Within the scope of so-called e-commerce, the Internet offers a very popular method of distributing products. Here, product suppliers set up virtual shops, so-called web shops and offer the products using electronic catalogues in the form of HTML or WML pages, which are saved in storage devices of server computers, for distribution over the Internet. The suppliers or web shop operators employ the usual techniques, such as servlets, server side include and CGI scripts to generate dynamic, interactive web pages which, for example, illustrate the electronic catalogue and through which the scope of functions of the appropriate web shop is achieved.

Using a computer or a WAP-compatible mobile telephone, a potential customer can visually display the electronic catalogue of a web shop on an appropriate display device. To order a product over the Internet from the web shop a so-called electronic shopping basket is set up for the potential customer in which the products to be ordered are placed.

A disadvantage of the above form of distributing products is that, as described above, complex techniques are required in order for the supplier to be able to set up a functioning web shop and operate e-commerce. Furthermore, due to the complexity of the techniques involved, only professional suppliers are able to set up web shops to distribute products.

For the case taken as an example in which a private Internet user has available personal web pages, i.e. HTML or WML content, in which he makes reference to and publishes a small number of pictures or photographs, these pictures represent data which are saved in a storage device of a computer of the Internet user or a so-called Internet provider. In order not to unnecessarily retard the transmission speed of the pictures referenced in HTML or WML content, high resolution digital pictures are not integrated into the relevant web pages, but instead digital pictures with reduced amounts of data. In particular in this case given as an example, it is not worth setting up a complex web shop, just to distribute a few pictures. An interested viewer must therefore establish contact to the Internet user if he is interested in a high resolution version or a photographic print, which represents further effort on the part of the viewer as well as the Internet user.

Starting from the known state of the art the object of this invention is to provide a method for distributing pictures over a network with which a supplier of pictures can offer pictures simply and efficiently for distribution over a network.

This object is solved based on the object of patent claim 1.

Preferred embodiments of this invention are the object of the subclaims.

In particular the object of this invention is solved by a method for the distribution of pictures over a network, whereby a supplier computer, web shop computer and a customer computer are connected to the network, whereby a supplier makes a large number of pictures accessible via the Internet and enables the purchase via a web shop. In this respect digital data representing the supplier's pictures are saved in a storage device of the supplier computer, whereby at least one hyperlink is assigned to the digital data and at least one hyperlink is used for initiating an ordering method for ordering at least one picture and it references information or contains information referring to the web shop computer. In a further step the establishing of a connection between the customer computer and the supplier computer occurs via the network. The data saved in the storage device of the supplier computer are read out and the relevant pictures and the at least one assigned hyperlink are displayed on the display device of the customer computer. For ordering at least one picture the customer activates the hyperlink, following which, in response to the activation of the hyperlink, the establishment of a connection between the customer computer and the web shop computer occurs over the network for initiating the ordering method. The ordering method is carried out and a confirmation query is sent from the web shop computer to the customer computer, including reference data representing the at least one ordered picture. The confirmation query is received by the customer computer and a confirmation message is sent from the customer computer to the web shop computer for the case in which the appropriate order is to be carried out. In response to a positive confirmation by the customer a connection is established between the web shop computer and the supplier computer via the network and those digital data representing the at least one ordered picture are read out of the storage device of the supplier computer by the web shop computer. The picture data which are read out are prepared according to the customer's desired picture format.

According to a preferred variant of this invention the at least one hyperlink represents a picture link whereby a separate picture link is assigned to each offered picture from the supplier, the picture link containing information of the assigned picture or referring to it. Hence, a customer must activate the picture link of the picture that is to be ordered.

According to another variant of this invention, the at least one hyperlink represents a form link so that a large number of offered pictures from the supplier can be assigned to a common form link within the framework of an electronic order form, the form link containing or referring to information with regard to at least one ordered picture. The electronic order form contains in particular fields for selecting at least one picture and an order field that can be activated for ordering the at least one selected picture. A completed electronic order form is sent from the customer computer to the web shop computer by clicking on the order field, preferably by clicking with a computer mouse, whereby the form link is activated by clicking the order field.

Furthermore, a large number of offered pictures from the supplier can in turn be assigned to a common form link which contains information regarding a special software program for creating an electronic order form for ordering at least one picture or which refers to it.

One advantage of the method according to the invention is that more or less all existing stocks of pictures in the Internet can be rendered capable of being ordered, whereby individual, in particular also private suppliers, who, for example, show pictures on the home pages or other personal web pages, can render them capable of being ordered by adding a simple hyperlink and can efficiently distribute them without employing complex techniques.

In the web shop computer an electronic shopping basket is set up for the customer. The setting up of the shopping basket preferably occurs in response to the activation of the at least one hyperlink. In particular, setting up only occurs for the case in which no electronic shopping basket has been set up yet for the relevant customer. In the electronic shopping basket information is placed which represents the at least one ordered picture and from which at least one hyperlink is set.

The data saved in the storage device of the supplier computer can represent HTML or WML content. The network is preferably the Internet, whereby the supplier computer can be managed by an Internet provider. Consequently, a supplier, who wants to offer digital pictures over the Internet, does not necessarily need to make these digital data available on a personal computer, but can instead make them accessible on any computer accessible via the Internet. The customer computer can be implemented as a mobile telephone which is WAP or UMTS-compatible.

In particular, the method according to the invention is suitable for the participation of a large number of suppliers and/or for the participation of a large number of customers.

The preparation of the picture data that are read out includes sending the picture data to a photographic laboratory and the printing of at least one appropriate photographic print in paper form according to the customer's desired picture format. The printing of the at least one photographic print includes delivery of the at least one photographic print to the customer. The delivery of the at least one photographic print to the customer preferably occurs via letter or parcel post and can be carried out directly by the photographic laboratory.

In particular, in response to a positive confirmation by the customer, a payment method is initiated in which payment occurs of the at least one ordered picture starting from a customer account created for the customer or, for example, by stating a suitable credit card number in the customer's confirmation message. According to another variant, the payment of the ordered pictures can also occur by the customer after delivery of the photographic prints through collection via invoice.

Other preferred embodiments of this invention are explained in more detail based on the following figures. In detail, the figures show:

Figure 1:
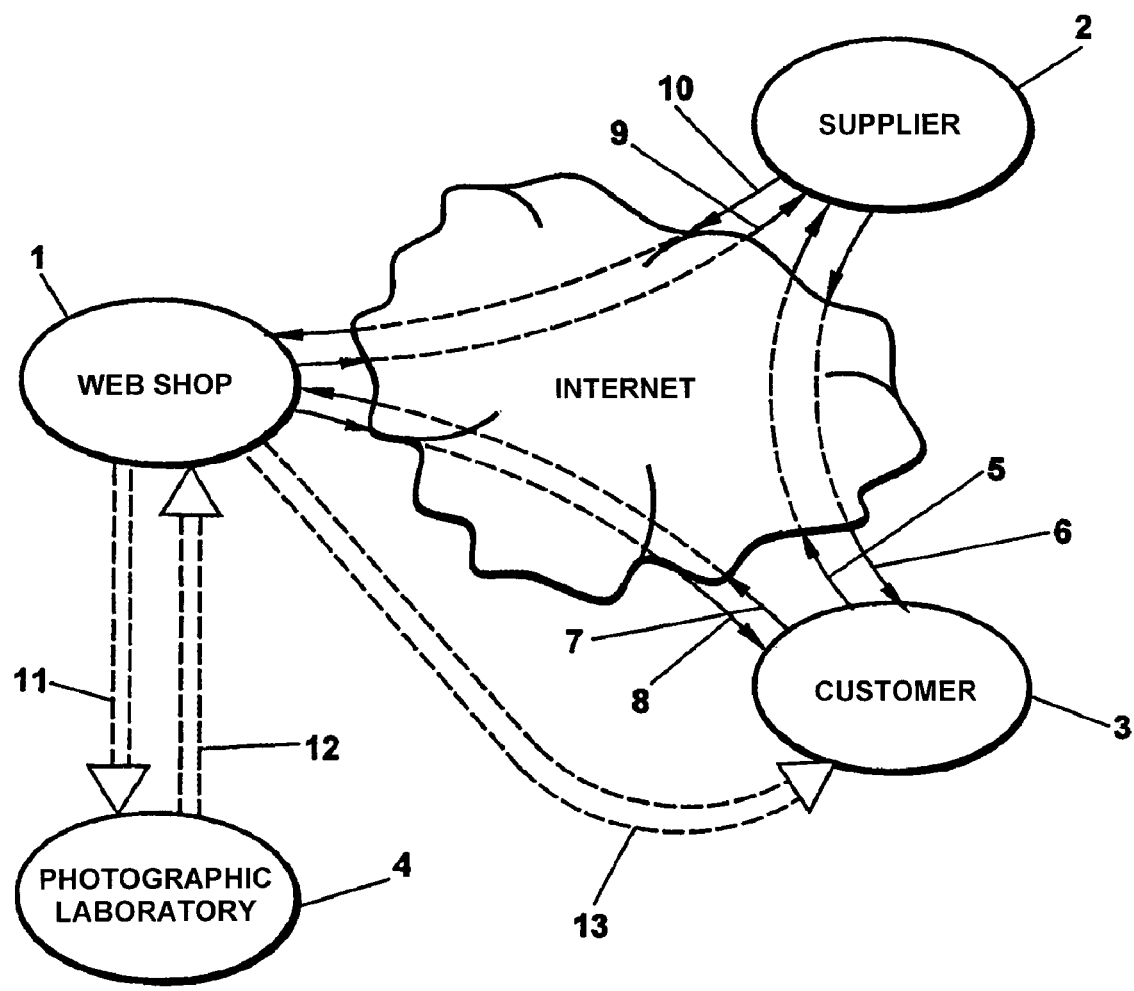
FIG. 1 shows a block diagram for the illustration of a system for distributing pictures via the Internet according to a preferred embodiment of this invention.

FIG. 1 shows a system for distributing pictures according to a preferred embodiment of this invention, with a so-called web shop 1, a large number of suppliers 2 and a large number of customers 3, as well as a photographic laboratory 4. The web shop 1, each supplier 2 and each customer 3 each have available preferably in each case a computer, the computers being connected to one another via the Internet 4, whereby especially the web shop 1 can be operated fully automatically.

The suppliers 2 make photographs or pictures available and publish these in the Internet. The suppliers 2 may be professional customers, such as broadcasting organisations or photographers who, for example, want to publish and distribute pictures of public events. On the other hand, private customers can also publish their photographs in the Internet and distribute them according to the invention. A special feature of the possible suppliers 2 is that they have available a method of propagating their pictures over the Internet, but do not have the structures of a web shop in the classical sense to professionally distribute these pictures. This means, for example, that a private supplier can publish pictures that he has taken preferably within the scope of HTML or WML content and save the corresponding digital data in a storage device on his computer accessible via the Internet or save the data in a storage device of a so-called Internet provider. The HTML or WML content can represent specific web pages such as home pages or picture galleries.

A customer 3 establishes a connection, in each case preferably via the Internet, between his computer and the computer of a certain supplier 2 who is publishing pictures and offering them for distribution. For example, the customer 3 sends his enquiry 5 via the Internet to the computer of the supplier 2 to interrogate (6) appropriate HTML or WML content. This content can be displayed on a suitable graphical display device on the customer's computer. From the large number of displayed pictures the customer 3 can select one or more pictures which he would like to order.

For ordering, data are interchanged between the computer of the customer 3 and the computer of the web shop 1 via Internet connections 7, 8 which is explained in more detail in the following.

First of all, the customer 3 activates a hyperlink inserted in the HTML or WML page of the supplier 2. On activating the hyperlink, the computer of the customer 3 establishes an Internet connection with the computer of the web shop 1 and sends information for initiating an ordering method to the web shop 1.

According to a first variant, each offered picture of the supplier 2 is assigned a separate hyperlink, which, for example, can be activated by clicking on the corresponding picture with a computer mouse. According to another variant, a so-called form link is created. On activating the form link, a connection to the computer of the web shop 1 is in turn established and the information contained in the hyperlink is sent to the web shop 1. In this case the information preferably includes the name of a special, web-based script for creating a dynamic order form, with the aid of which simultaneously a number of pictures can be ordered from the supplier 2. In this respect, the computer of the web shop 1 sends data representing the dynamic order form via the Internet to the computer of the customer 3. The data are evaluated in the computer of the customer 3 and the corresponding order form is displayed on the graphical display device, whereby the customer 3, for example using a computer mouse or a keyboard, can define which pictures he would like to order. For the case where the customer 3 uses a computer mouse for this, a pick list, from which all pictures from the supplier 2 can be selected, can be shown in the displayed order form. The completed order form is sent by the customer 3 via the Internet to the web shop 1.

To conclude the ordering method, i.e. when the customer 3 has selected all the pictures of the supplier 2 which he would like to order, he sends an appropriate message to the web shop 1. This occurs for example by activating an order field on the graphical display device by clicking with the computer mouse.

According to an especially preferred embodiment of this invention, the supplier 2 sets up an order form on his HTML or WML page which contains any number of fields, a defined action and a so-called submit button which preferably initiates the action on being clicked with a computer mouse. The supplier 2 places preferably in each case a so-called check box under each picture and defines the data in each case where the appropriate picture file is located. Consequently, according to this variant, a picture link is not assigned to each picture, but instead in each case to a form field. Information which represents pictures selected by the customer 3 is sent by activating the common submit button in the framework of the message from the customer computer to the web shop computer. This means that the defined action represents sending the information and the submit button represents the form link.

In particular, the HTML or WML content can be displayed on the customer's graphical display device such that the customer "ticks" each picture which he wants to order and by clicking the submit button in the framework of the message sends information to the web shop computer which describes what has been ticked, i.e. the content of the form. Consequently, multiple orders are possible.

Therefore, preferably a web browser in the supplier computer sets up from the form data a form link on which all the information of the form is appended. When the customer 3 clicks the submit button, the browser calls the form link which includes the form data as parameters, whereby the customer computer is connected to the web shop computer and sends the form data to it in the framework of the message. A script which processes the parameters then runs on the web shop computer.

The order form which the customer 3 can set up for this sort of multiple order is standard HTML, i.e. the customer 3 does not need to install scripts or other software programs, but instead preferably just keeps to a structure specified by the web shop 1.

The orders received by the web shop 1 are evaluated by the web shop computer and a so-called electronic shopping basket is created for the relevant customer 3 in which the data are written which represent the pictures he has selected. The web shop computer determines this data based on the information which is received within the framework of the activated picture or form link.

After receiving the message, the web shop 1 creates an order contract for the customer 3 in which the pictures referenced using the shopping basket are identified. Preferably, data which represent the created order contract are sent for checking of the order for completeness and errors to the customer 3, whereby the customer 3 is requested to confirm the order contract.

In response to a confirmation of this type, the computer of the web shop 1 sends a query 9 over the Internet to the computer of the supplier 2 to request the digital data representing the ordered pictures. The computer of the supplier 2 processes this request and sends the response 10 containing the digital data of the ordered pictures via the Internet to the computer of the web shop 1. The information with regard to the supplier computer in which these digital data are stored is determined by evaluation of the picture or form link of the supplier. Therefore, the picture data need not necessarily be located on a computer of the supplier 2, but can be available somewhere in the Internet instead, whereby for example a storage device of an Internet provider's computer represents the supplier computer. Furthermore, these data can for example be protected by a password to protect the supplier's high resolution pictures.

The web shop computer receives these digital data and processes them in order to preferably have a photographic laboratory 4 produce real corresponding photographs. The transfer of the digital data 11 preferably also occurs over the Internet.

The photographic laboratory 4 produces the desired number of real photographic prints and transfers them within the framework of a delivery 12 to the web shop 1 which in turn delivers the pictures to the customer 3 within the scope of a delivery 13. In this respect, the photographic laboratory 4 can be part of the web shop 1.

The deliveries 12, 13 are preferably deliveries in the classical sense, for example by letter or parcel post. According to another variant the deliveries can be carried out by special delivery companies. In particular, the delivery of the desired real photographic prints can occur directly from the photographic laboratory 4 to the customer 3.

Furthermore, a payment method is initiated preferably by the web shop computer. In this respect the customer 3 can for example make a payment by entering a credit card number, whereby the order is only carried out by the web shop computer for the case in which checking of the relevant credit card provides a positive result. According to another variant, the customer 3 can open a customer account with the web shop 1 on which, with appropriate credit worthiness, a certain credit scope is allowed which is balanced as required by automatic monthly payments, which is of particular advantage to major customers. The supplier 2 preferably receives a percentage share of the distribution of his pictures, the level of which can be agreed between the supplier 2 and the web shop 1. According to another variant payment of ordered pictures can occur via collection per invoice.

One advantage of the system according to the invention for distributing pictures is that suppliers of pictures are offered a method of publishing and distributing pictures over the Internet without having available complex techniques for the generation of dynamic interactive web pages, such as servlets, servers, side include or CGI, through which the functional scope of a typical web shop is achieved. In particular, the order method is transparent to the customer 3, i.e. on activating an appropriate hyperlink the customer 3 is passed to the web shop 1 where an electronic shopping basket is set up for him and in which identifiers and references of those pictures are placed which the customer 3 would like to order. The information necessary for this is taken directly from the hyperlink or from the completed order form. To order the content of the shopping basket the customer 3 initiates a normal order method within the framework of e-commerce.

Another advantage of the system according to the invention is that the customer 3 can order pictures which are available somewhere in the Internet and that the appropriate data representing the pictures do not need to be available on the web shop computer, whereby the structures necessary for this are substantially simplified on the side of the web shop 1.

Normally, the connections 5 to 10 are established over the Internet via a fixed network. According to another embodiment of this invention, the connections 5 to 10 can at least partially be established over an appropriate mobile telephone network, whereby the customer 3 for example using a WAP-compatible mobile telephone interrogates WML content on the computer of the supplier 2 and displays it on the display of the mobile telephone. In particular the UMTS (Universal Mobile Telecommunications Systems) technology can be used.

Figure 2:
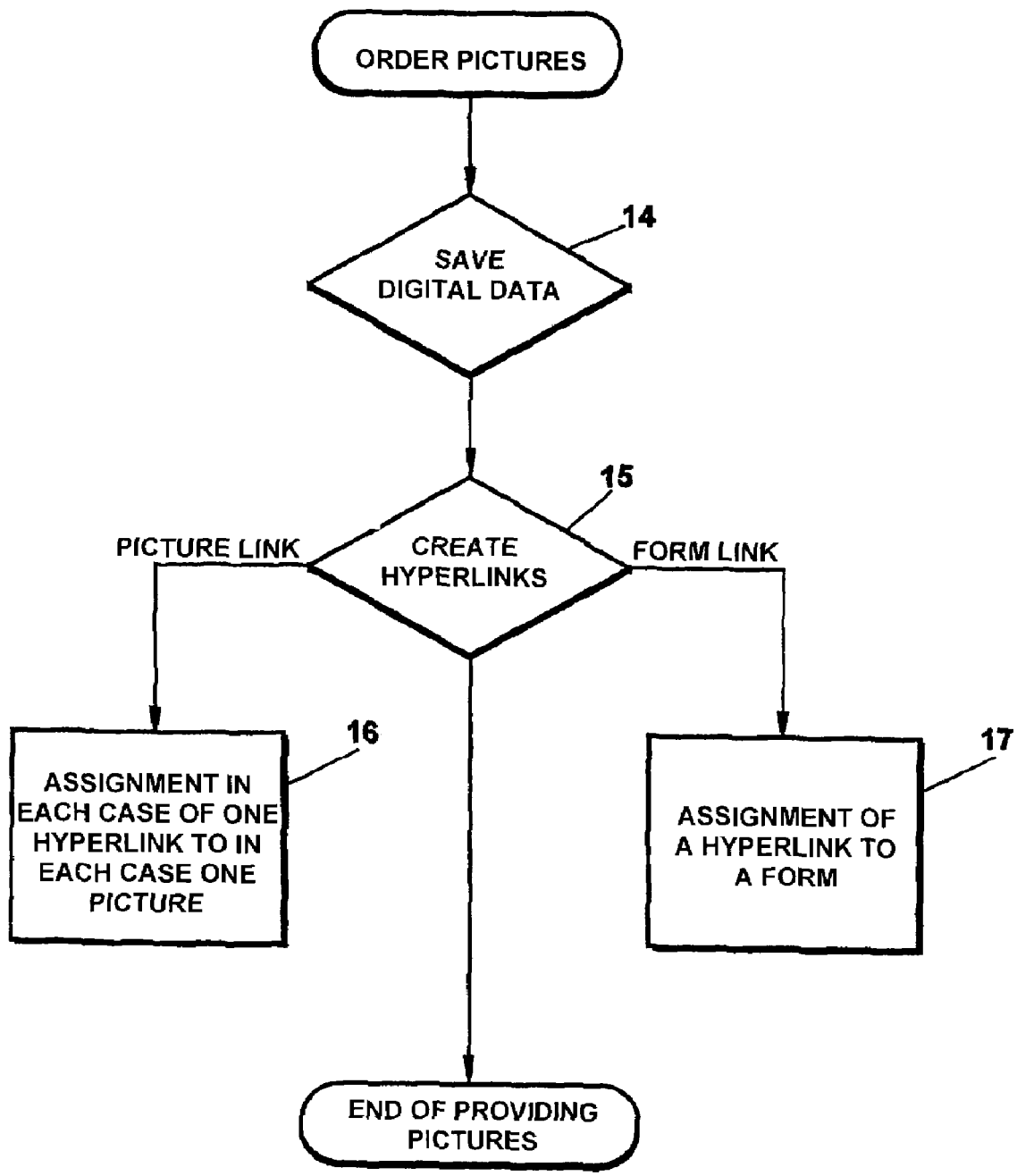
FIG. 2 shows a flow chart for the illustration of the procedural steps for providing the pictures.

FIG. 2 shows a flow chart to illustrate the procedural steps for providing pictures which are published by a supplier preferably in the Internet and offered for distribution through a suitable web shop.

In step 14 an appropriate supplier saves digital data representing the offered pictures in a storage device accessible via the Internet. In this respect, a storage device at the supplier's computer may be involved or a storage device at an Internet provider, who for example manages the supplier's home page. In particular, digital data can be integrated into HTML contents on the supplier's home page or on web pages specially provided for this purpose.

In step 15 the supplier creates one or more hyperlinks. According to a first variant, the created hyperlinks are implemented as picture links, i.e. a certain hyperlink is assigned to each picture, whereby this hyperlink references the web shop and includes information used for ordering the associated picture. This information includes preferably a complete Internet address or a Uniform Resource Locator (URL) under which the picture can be found or an internal data base identification. According to another variant, the created hyperlink is implemented as a form link, i.e. the hyperlink references in turn the web shop and on being activated by a customer, causes a digital order form to be sent to the customer's computer from the web shop, the order form being able to be used for ordering a large number of pictures from the corresponding supplier. In particular, this digital order form is implemented as a dynamic order form in which the customer can set a quantity, i.e. the number of prints and the size of the desired real photographs. The form link includes for example data which identify the name of a special script and parameters for the control of this script, whereby calling the script causes the data representing the digital order form to be sent to the customer's computer.

According to a particularly preferred embodiment of this invention, the supplier sets up an order form on his HTML or WML page which contains any number of fields, a defined action and a so-called submit button which preferably initiates the action on being clicked with a computer mouse. The supplier places preferably a so-called check box under each picture and defines in each case the data where the corresponding picture file is located. The defined action represents the sending of the information and the submit button represents the form link.

Figure 3:
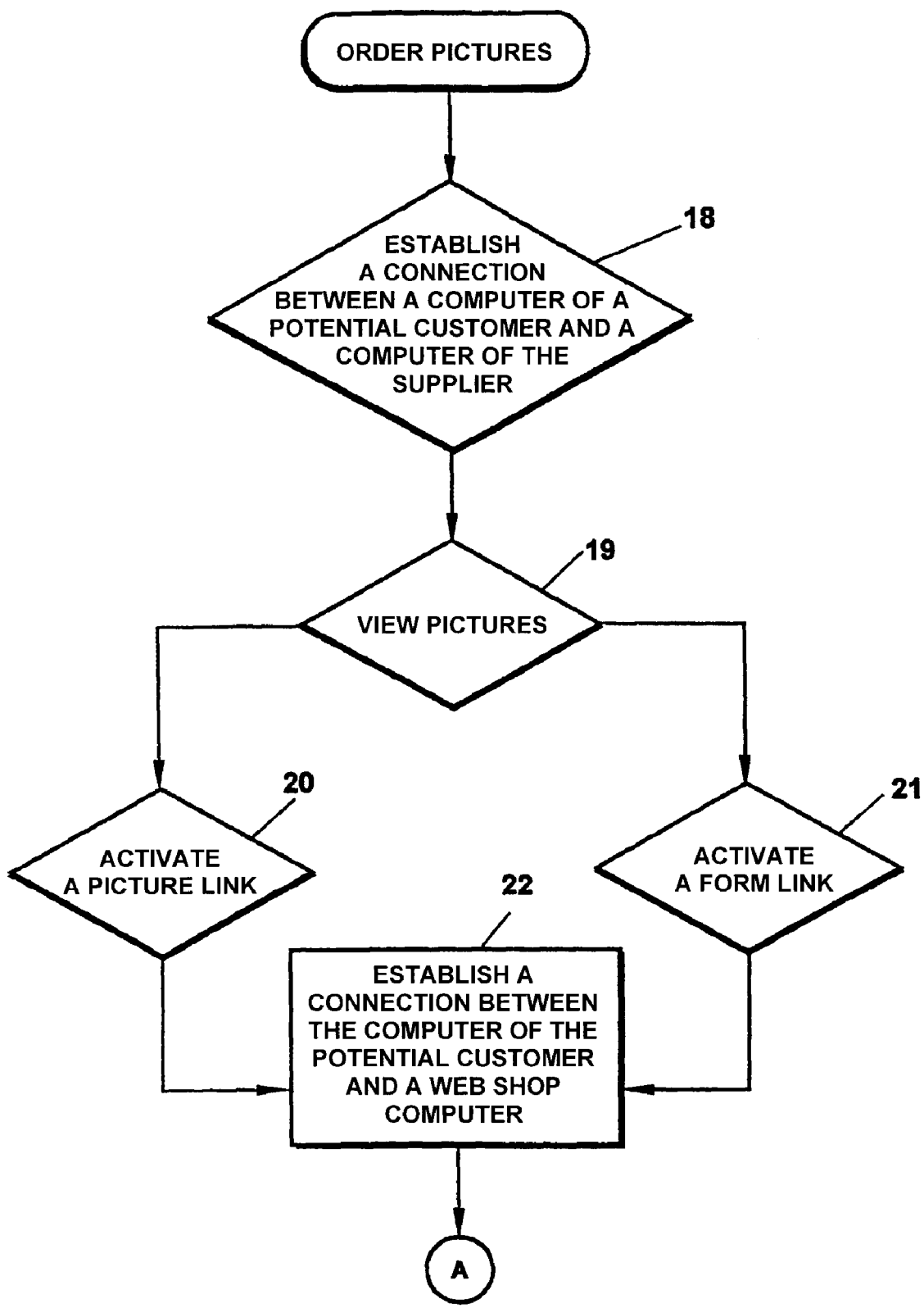
FIG. 3 shows a flow chart for the illustration of the procedural steps for viewing and ordering pictures.
Figure 4:
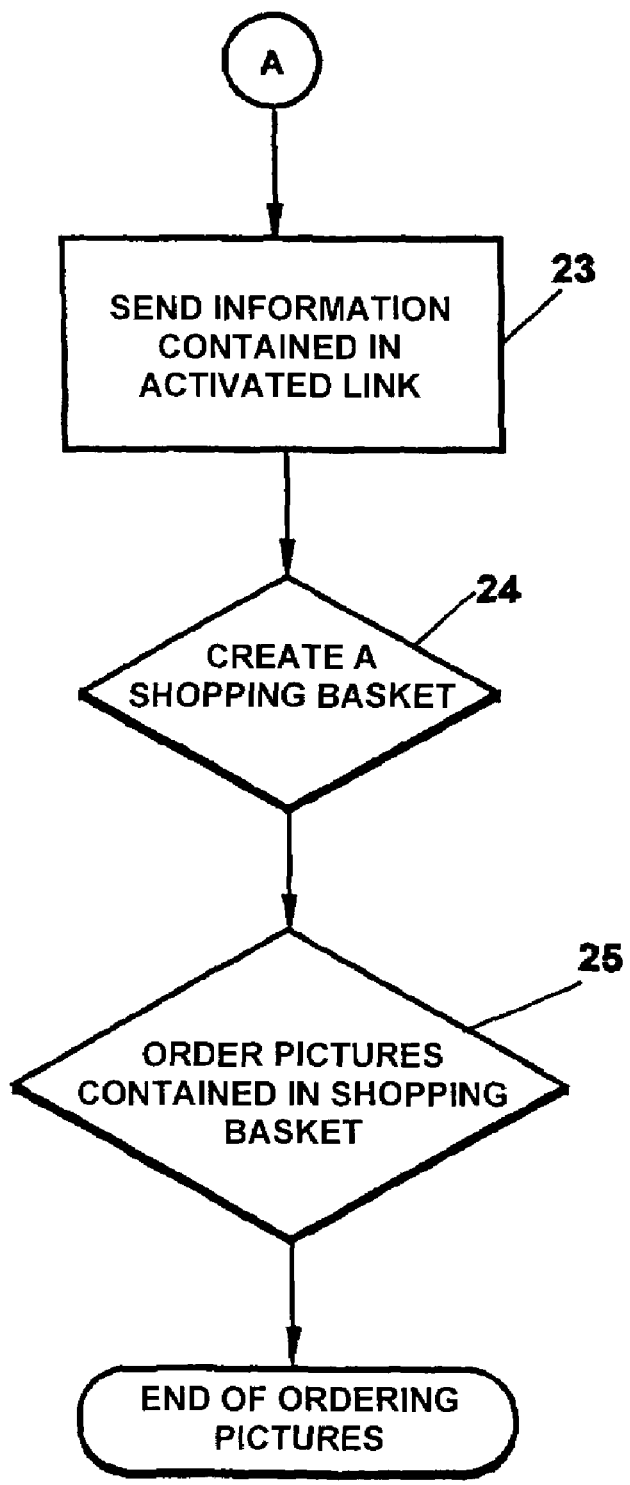
FIG. 4 shows a continuation of the flow chart in FIG. 3.

This sort of ordered picture can be viewed by potential customers via the Internet and ordered from the appropriate web shop, which is explained in more detail based on FIGS. 3 and 4.

FIG. 3 shows a flow chart for the illustration of method steps for the viewing and ordering of a supplier's pictures by a customer whereby the supplier's pictures are accessible to the customer in the form of digital pictures via the Internet.

In step 18 the customer establishes a connection preferably over the Internet between a computer suitable for this and a computer of the supplier. For the case where the supplier makes the pictures available in the form of digital data within the scope of HTML contents or WML contents which are saved in a storage device at an Internet provider, the connection is established between the potential customer's computer and an appropriate computer of the Internet provider.

In step 19 the potential customer views the pictures offered by the supplier. For this, he can display for example the home page or the appropriate web page of the supplier on a graphical display of his computer. To initiate an ordering method the customer activates either according to step 20 a picture link which is assigned to the corresponding picture which is to be ordered and which references a web shop or according to step 21 a form link which preferably references a special script on a web shop computer for creating a dynamic order form or for sending form data which represent a completed order form. As explained in step 22, the activation of a picture link or a form link causes the establishment of a connection between the customer's computer and the web shop computer.

FIG. 4 shows a continuation of the flow chart according to FIG. 3. After the connection has been established according to step 22 in FIG. 3, then in step 23 information which is contained in the link activated in step 20 or 21 is sent from the customer's computer to the web shop computer. This information identifies one or several desired pictures. In step 24 the creation of a shopping basket for the customer occurs in the web shop computer, whereby those pictures ordered by the customer from the web shop are placed into the shopping basket.

In step 25 the ordering of the pictures contained in the shopping basket occurs at the web shop. For this, the corresponding customer confirms the order which he has placed at the web shop, whereby for example data representing the order and identifying all the ordered pictures is sent from the web shop to the customer so that the customer can check the order for completeness and freedom from errors and can then confirm the order.

Figure 5:
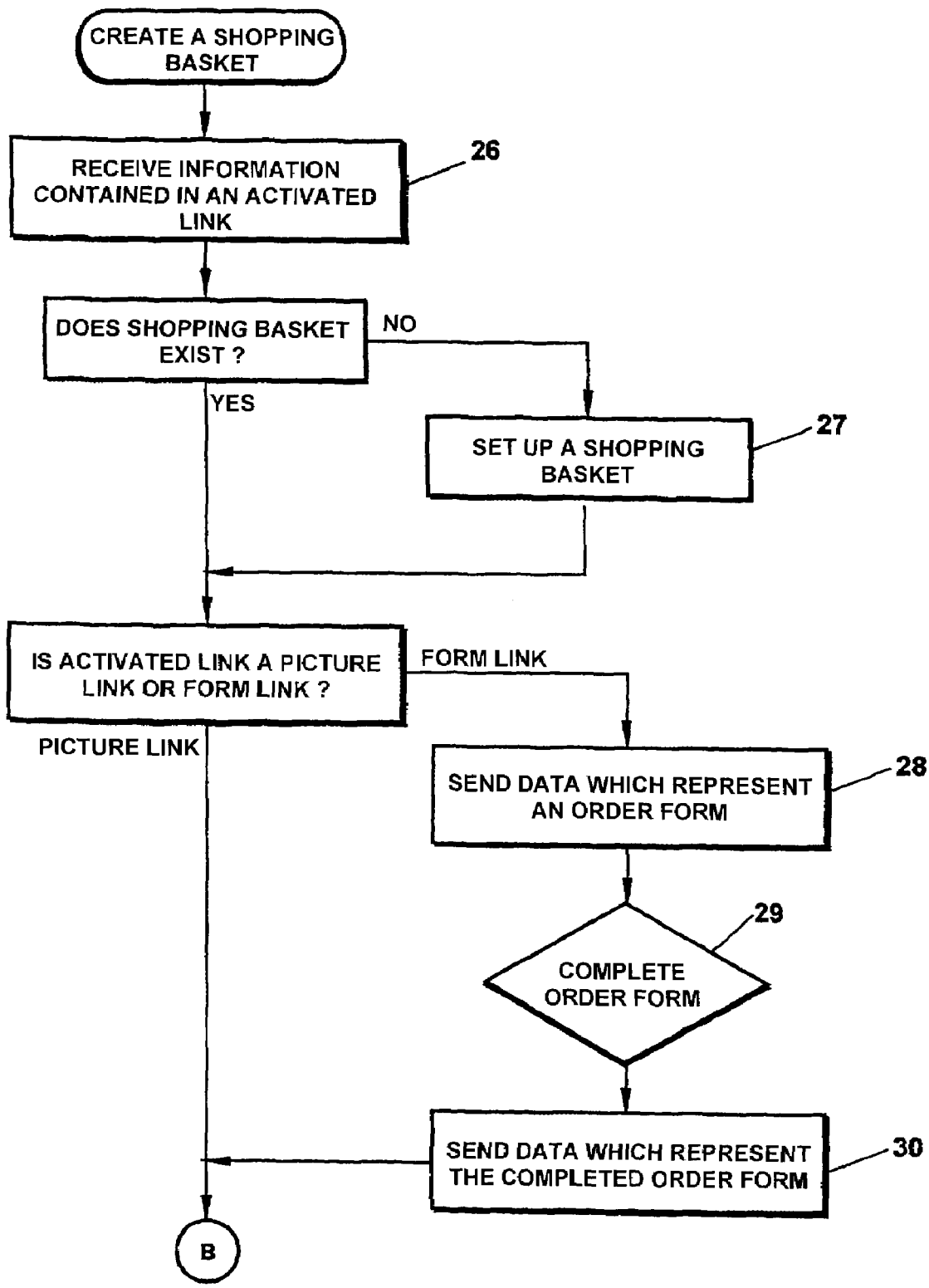
FIG. 5 shows a flow chart for the illustration of the creation of a shopping basket.

FIG. 5 shows a flow chart for the illustration of the procedural steps for creating an electronic shopping basket in a web shop computer, whereby on the activation of a form link, data representing a dynamic order form are sent from a web shop computer to a customer computer.

In step 26 data are received in the web shop computer, the data representing the information contained in an activated link with regard to one or more pictures to be ordered.

For the case in that no shopping basket has been set up in the web shop for the customer yet, the setting up of this type of shopping basket occurs in step 27. Then a check follows to determine whether the activated link is a picture link or a form link.

For the case where the activated link is a form link, the data representing an order form for ordering one or more pictures from the supplier are sent in step 28 from the web shop computer to the customer computer, the data being able to be displayed on a graphical display device on the customer computer.

In step 29 the customer can complete the displayed, dynamic order form and in particular enter information which identifies the desired pictures, the number of desired prints and the size of the prints. In step 30 data representing the completed order form is sent from the customer's computer to the web shop computer.

Figure 6:
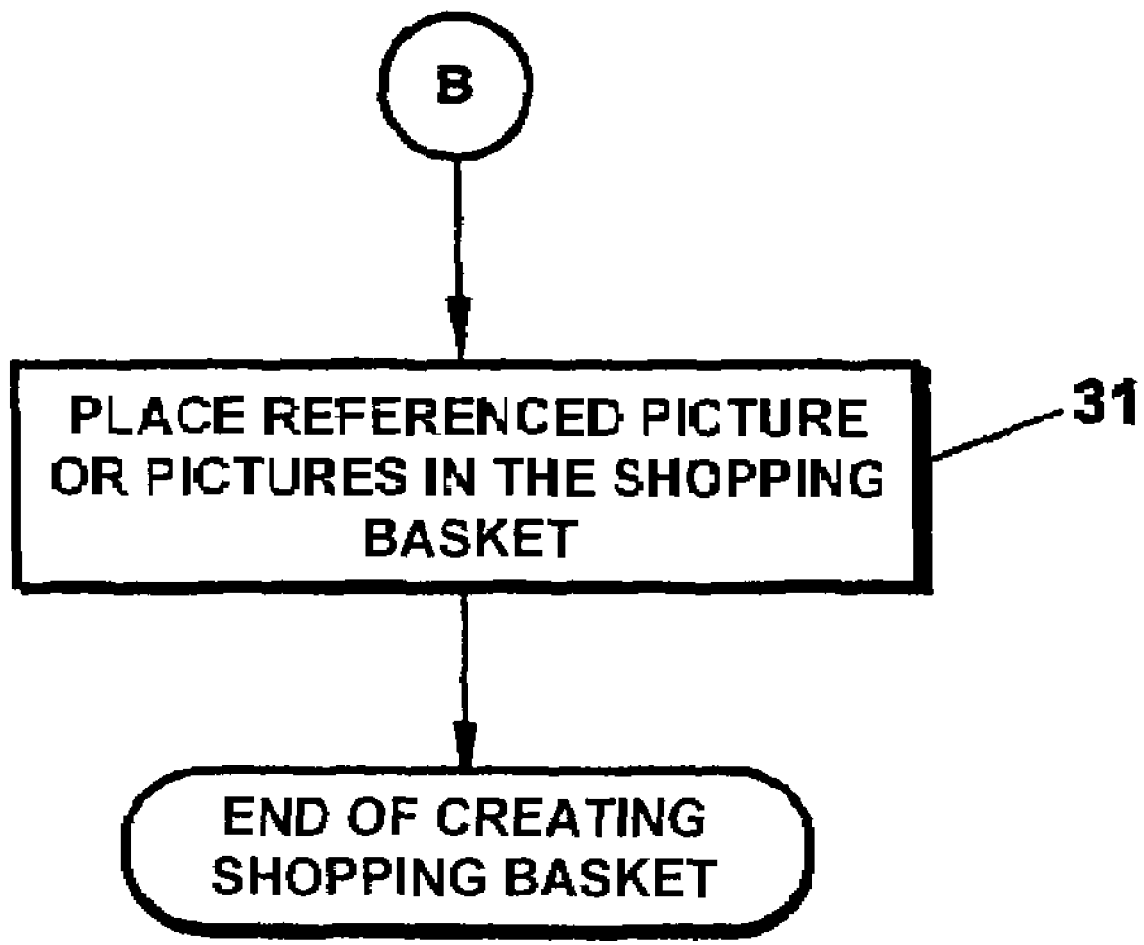
FIG. 6 shows a continuation of the flow chart in FIG. 5.

FIG. 6 shows a continuation of the flow chart in FIG. 5.

In step 31 the information contained in the picture link or in the completed order form is evaluated and the appropriately referenced pictures are placed in the created shopping basket.

The processing of confirmed orders by the web shop, i.e. for example transfer of the digital data representing the pictures, from the appropriate supplier computer to the appropriate web shop computer and the creation of a production contract for an appropriate photographic laboratory and the sending of the real photographs produced by the photographic laboratory occurs preferably according to the state of the art.

In particular, the method according to the invention can also be applied to the distribution of pictures when a supplier only wants to offer one single picture.

The invention claimed is:

1. A method for distributing pictures over a network, whereby a supplier computer, a web shop computer and a customer computer are connected to a network, whereby a supplier makes a plurality of pictures available over the network and enables the purchase via a web shop, the method comprising the following steps:

saving digital data representing the pictures of the supplier in a storage device of the supplier computer;

assigning at least one hyperlink to the digital data, whereby the said at least one hyperlink is used for initiating an order method for ordering at least one picture and which references or includes information which references the web shop computer and a web-based script for creating an order form;

establishing a connection between the customer computer and the supplier computer via the network;

reading out the data saved in the storage device of the supplier computer and displaying of the appropriate pictures and the at least one assigned hyperlink on a display device of the customer computer;

activating the hyperlink by the customer for ordering at least one picture;

in response to the activation of the hyperlink, establishing of a connection between the customer computer and the web shop computer via the network for initiating the order method, executing the web-based script to create an order form and creating a shopping basket;

executing the order method and sending of a confirmation query from the web shop computer to the customer computer, including reference data which represent the at least one ordered picture;

receiving the confirmation query by the customer computer and sending a confirmation message from the customer computer to the web shop computer for the case where the corresponding order is to be executed;

in response to a positive confirmation by the customer establishing a connection between the web shop computer and the supplier computer via the network;

reading out those digital data, which represent the at least one ordered picture, by the web shop computer from the storage device of the supplier computer; and preparing the read-out picture data according to the picture format desired by the customer.

2. The method according to claim 1, wherein at least one hyperlink represents a picture link and that a separate picture link is assigned to each picture offered by the supplier, the said picture link containing or referring to information with regard to the assigned picture.

3. The method according to claim 1, wherein at least one hyperlink represents a form link and that a common form link is assigned to a large number of pictures offered by the supplier, within the scope of an electronic order form, this form link containing or referring to information with regard to at least one ordered picture.

4. The method according to claim 3, wherein the electronic order form exhibits fields for the selection of at least one picture and an order field that can be activated for ordering the at least one selected picture.

5. The method according to claim 3, wherein the form link is activated by clicking the order field in the electronic order form.

6. The method according to claim 1, wherein at least one hyperlink represents a form link and that a common form link is assigned to a large number of pictures offered by the supplier, and the said form link includes or refers to information with regard to a special software program for the generation of an electronic order form for the ordering of at least one picture.

7. The method according to claim 1 wherein an electronic shopping basket is set up in the web shop computer for the customer.

8. The method according to claim 7, wherein the electronic shopping basket is set up in respond to the activation of the at least one hyperlink.

9. The method according to claim 7, wherein the electronic shopping basket is set up for the case where no electronic shopping basket has been set up yet for the corresponding customer.

10. The method according to claim 7, wherein information is placed in the electronic shopping basket which represents the at least one ordered picture and is determined from the at least one hyperlink.

11. The method according to claim 1, wherein the data saved in the storage device of the supplier computer represent HTML contents.

12. The method according to claim 1, wherein the data saved in the storage device of the supplier computer represent WML contents.

13. The method according to claim 1, wherein the network is the Internet.

14. The method according to claim 1, characterized in that wherein the supplier computer is managed by an Internet provider.

15. The method according to claim 1, wherein the customer computer is a mobile telephone.

16. The method according to claim 15, wherein the mobile telephone is WAP-compatible.

17. The method according to claim 15, wherein the mobile telephone is UMTS-compatible.

18. The method according to claim 1, wherein a large number of suppliers take part in the method.

19. The method according to claim 1, wherein a large number of customers take part in the method.

20. The method according to claim 1, wherein the processing of the read-out picture data includes sending the picture data to a photographic laboratory.

21. The method according to claim 1, wherein the processing of the read-out picture data includes the printing of at least one appropriate photographic print in paper form according to the desired picture format.

22. The method according to claim 21, wherein the printing of at least one photographic print includes delivering the at least one photographic print to the customer.

23. The method according to claim 22, wherein the delivery of the at least one photographic print to the customer includes delivery by letter or parcel post.

24. The method according to claim 22, wherein delivery of the at least one photographic print is carried out by the photographic laboratory.

25. The method according to claim 1, wherein a payment method is also initiated in response to a positive confirmation by the customer.

26. The method according to claim 1, wherein payment of the ordered pictures by the customer occurs after delivery by collection via invoice.

27. A system for distributing pictures over a network, comprising:

a computer processor;

means for saving digital data representing a pictures of a supplier in a computer of the supplier;

means for assigning at least one hyperlink to the digital data, whereby the said at least one hyperlink is used for initiating an order method for ordering at least one picture and which references or includes information which references a web shop computer and a web-based script for creating an order form;

means for establishing a connection between a customer computer and the supplier computer;

means for reading out the data saved in the supplier computer and displaying of appropriate pictures and the at least one assigned hyperlink on a display device of the customer computer;

means for activating the hyperlink for ordering at least one picture;

means for establishing of a connection between the customer computer and the web shop computer via the network for initiating the order method, executing the web-based script to create an order form, and creatina a shoDDinci basket, in response to the activation of the hyperlink;

means for executing the order method and sending of a confirmation query from the web shop computer to the customer computer, including reference data which represent the at least one ordered picture;

means for receiving the confirmation query by the customer computer and sending a confirmation message from the customer computer to the web shop computer for the case where the corresponding order is to be executed;

means for establishing a connection between the web shop computer and the supplier computer via the network in response to a positive confirmation by the customer;

means for reading out those digital data, which represent the at least one ordered picture, by the web shop computer from the supplier computer; and means for preparing the read-out picture data according to the picture format desired by the customer.

28. The system of claim 27, wherein said means for saving, said means for assigning the at least one hyperlink, said means for establishing the connection between a customer computer and the supplier computer, said means for reading out the data, said means for activating the hyperlink, said means for establishing of the connection between the customer computer and the web shop computer, said means for executing the order method, said means for receiving the confirmation query, said means for establishing a connection between the web shop computer and the supplier computer, said means for reading out those digital data, and said means for preparing the read-out picture data comprise devices of a computer system.

29. The system of claim 27, wherein said means for saving, said means for assigning the at least one hyperlink, said means for establishing the connection between a customer computer and the supplier computer, said means for reading out the data, said means for activating the hyperlink, said means for establishing of the connection between the customer computer and the web shop computer, said means for executing the order method, said means for receiving the confirmation query, said means for establishing a connection between the web shop computer and the supplier computer, said means for reading out those digital data, and said means for preparing the read-out picture data comprise computer readable instructions on a computer readable medium.

* * * * *